US012771253B2

(12) United States Patent
Lin et al.

(10) Patent No.: US 12,771,253 B2
(45) Date of Patent: Oct. 20, 2026

(54) DUAL-OUTPUT POWER CONVERTER

(71) Applicant: National Taiwan University, Taipei (TW)

(72) Inventors: Yuan-Chih Lin, Taipei City (TW); Xiao-Ze Lin, Taipei City (TW); Ching-Jan Chen, Taipei City (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 174 days.

(21) Appl. No.: 18/770,887

(22) Filed: Jul. 12, 2024

(65) Prior Publication Data

US 2025/0385612 A1 Dec. 18, 2025

(30) Foreign Application Priority Data

Jun. 13, 2024 (TW) ................................ 113121868

(51) Int. Cl.
*H02M 3/335* (2006.01)

(52) U.S. Cl.
CPC .................. *H02M 3/33561* (2013.01); *H02M 3/33569* (2013.01)

(58) Field of Classification Search
CPC ............ H02J 3/38; H02J 3/46; H02M 3/1582; H02M 3/1584; H02M 3/285; H02M 3/33561; H02M 7/49
See application file for complete search history.

(56) References Cited

U.S. PATENT DOCUMENTS 5,363,287 A * 11/1994 Liu .................. H02M 3/33561 348/730
10,425,012 B2 * 9/2019 Bianco ............. H02M 3/33561

* cited by examiner

*Primary Examiner* — Bryan R Perez
(74) *Attorney, Agent, or Firm* — BACON & THOMAS, PLLC

(57) ABSTRACT

The invention discloses a dual-output power converter, comprising: input voltage, a first N-channel power metal oxide semiconductor field effect transistor switch, a second N-channel power metal oxide semiconductor field effect transistor switch, and a resonant inductor, a transformer primary-side magnetizing inductor, a transformer primary-side coil, a resonant capacitor, and a resonant voltage, also, the invention comprises a first secondary-side coil of the transformer, a first diode, a first output capacitor, a first output resistor, and a first output voltage, and the invention further comprises a transformer second secondary-side coil, a second diode, a second output capacitor, a second output resistor, and a second output voltage; the invention also comprises a first controller, a second controller, a voltage divider, a first comparator, a second comparator, and a pulse width modulation generator, and comprises a third controller, a fourth controller, an first adder, and a second adder.

5 Claims, 3 Drawing Sheets

DUAL-OUTPUT POWER CONVERTER

BACKGROUND OF THE INVENTION

1. Field of the Invention

The present invention relates to a power converter, more particular to a dual-output power converter.

2. Description of the Prior Art

Generally, voltage regulator can provide a constant voltage despite changing in power supply or load current, ensuring that the power supply remains stable within a certain range by controlling the voltage output. Accompanying with the advancement of technology, multitasking and complex electronic systems require different voltages to drive various components. Additionally, these voltage regulators are often used in the power supply systems, also can work in conjunction with rectifiers and electronic filters to provide a stable voltage output.

Linear regulators are shown as for the linear operation due to the relationship between input and output. Conventional single-output linear regulators often require multiple sets of converters to meet increasingly complex application conditions. However, single-output linear regulators have lower efficiency, and dissipate energy as heat, when using a single power source, and adjusting the voltage through a conventional single-output linear regulator, it may result in inefficient power management, and high thermal risk due to poor heat dissipation of the regulator.

In recent years, the design of power management chips for use in system-on-chip (SoC) applications has become a hot topic. Each circuit within an SoC requires different power supply voltages, and the integrated voltage regulators on the chip can provide these voltages individually. Given the aforementioned voltage regulator, the industry today needs not only to meet the demands for different voltages in various systems, but also to improve efficiency and reduce costs. At this time, when voltage regulators that are small in size, with low noise, and respond quickly to transient changes, which are considered suitable for integration into chips.

SUMMARY OF THE INVENTION

The present invention provides a dual-output power converter, comprising: an input voltage, a first N-channel power metal oxide semiconductor field effect transistor (MOSFET) switch, a second N-channel power metal oxide semiconductor field effect transistor switch, a resonant inductor, a transformer primary-side magnetizing inductor, a transformer primary-side coil, a resonant capacitor, and a resonant voltage. It also comprises a transformer first secondary-side coil, a first diode, a first output capacitor, a first output resistor, and a first output voltage. Additionally, it comprises a transformer second secondary-side coil, a second diode, a second output capacitor, a second output resistor, and a second output voltage.

The present invention provides a dual-output power converter, which comprises a first controller, a second controller, a voltage divider, a first comparator, a second comparator, and a pulse width modulation generator.

The present invention provides a dual-output power converter, which comprises a third controller and a fourth controller. The third controller is electrically connected to the second adder, and is electrically connected to the first comparator, while the fourth controller is electrically connected to the first adder, and the second comparator.

One advantage of the dual-output power converter of the present invention is that it has fewer components and a simple implementation, offering an intuitive advantage.

One advantage of the dual-output power converter of the present invention, compared to other dual-output power converters, is the addition of inner loop charge control, which reduces the complexity for the controller design.

One advantage of the dual-output power converter of the present invention is the incorporation of a control method that decouples the dual outputs, ensuring that the output affected by the load does not impact the other output. This feature offers significant potential application value and feasibility in product applications. Using a dual-output power supply not only better meets the demands of various systems for different voltages but also improves efficiency and reduces costs.

One advantage of the dual-output power converter of the present invention is that it can achieve design and control simplicity and intuitiveness through both internal and external loop compensation. This allows for meeting dual power supply requirements with fewer components, ultimately maintaining high operational efficiency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
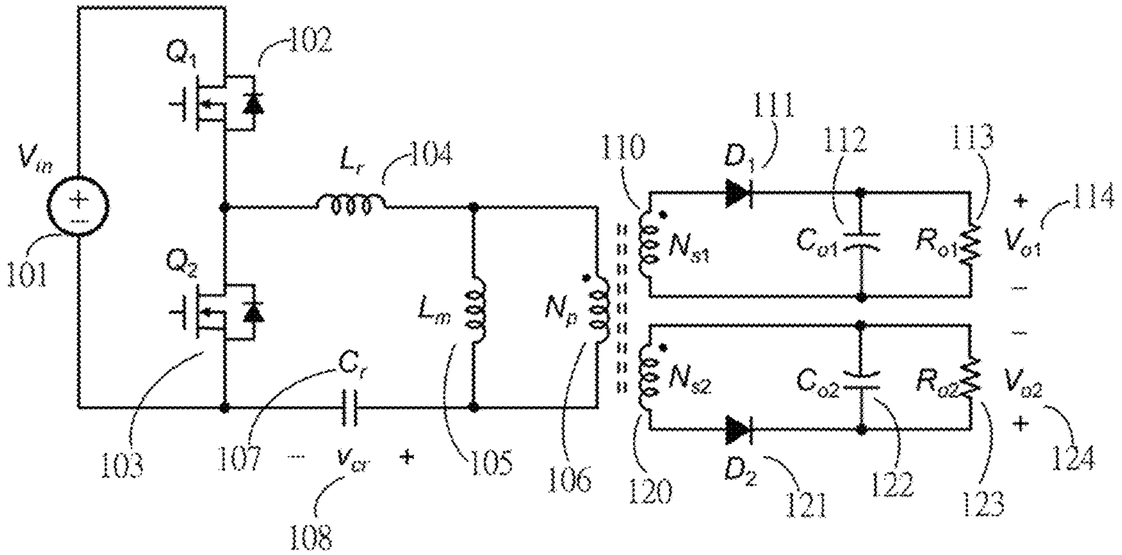
FIG. 1 shows the circuit diagram of the dual-output power converter of the present invention.

As shown in FIG. 1, the circuit diagram for the dual-output power converter of the present invention comprises the input voltage ($V_{in}$) 101, the first N-channel power metal oxide semiconductor field effect transistor (MOSFET) switch ($Q_1$) 102, the second N-channel power MOSFET switch ($Q_2$) 103, the resonant inductor ($L_r$) 104, transformer primary-side magnetizing inductor ($L_m$) 105, the transformer primary-side coil ($N_p$) 106, the resonant capacitor ($C_r$) 107, and the resonant voltage ($V_{cr}$) 108.

As shown in FIG. 1 of the circuit diagram for the dual-output power converter of the present invention, the first N-channel power MOSFET switch ($Q_1$) 102 is electrically connected to the input voltage ($V_{in}$) 101.

Furthermore, as shown in FIG. 1 of the circuit diagram for the dual-output power converter of the present invention, the second N-channel power MOSFET switch ($Q_2$) 103 is electrically connected to the input voltage ($V_{in}$) 101, and is also electrically connected to the first N-channel power MOSFET switch ($Q_1$) 102.

Continuing with FIG. 1 of the circuit diagram for the dual-output power converter of the present invention, the resonant inductor ($L_r$) 104 is electrically connected to the first N-channel power MOSFET switch ($Q_1$) 102, and is also electrically connected to the second N-channel power MOSFET switch ($Q_2$) 103.

Additionally, as shown in FIG. 1 of the circuit diagram for the dual-output power converter of the present invention, the transformer primary-side magnetizing inductor ($L_m$) 105 is electrically connected to the resonant inductor ($L_r$) 104.

As depicted in FIG. 1 of the circuit diagram for the dual-output power converter of the present invention, the transformer primary-side coil ($N_p$) 106 is electrically connected to the resonant inductor ($L_r$) 104, also is electrically connected to the transformer primary-side magnetizing inductor ($L_m$) 105.

Furthermore, as shown in FIG. 1 of the circuit diagram for the dual-output power converter of the present invention, the resonant capacitor ($C_r$) 107 with resonant voltage ($V_{cr}$) 108 is electrically connected to the input voltage ($V_{in}$) 101, the second N-channel power MOSFET switch ($Q_2$) 103, the transformer primary-side magnetizing inductor ($L_m$) 105, and the transformer primary-side coil ($N_p$) 106.

Continuing from FIG. 1 of the circuit diagram for the dual-output power converter of the present invention, the input voltage ($V_{in}$) 101 is electrically connected to the first N-channel power MOSFET switch ($Q_1$) 102. The first N-channel power MOSFET switch ($Q_1$) 102 is further electrically connected to the resonant inductor ($L_r$) 104, and the resonant inductor ($L_r$) 104 is electrically connected to the transformer primary-side magnetizing inductor ($L_m$) 105. Additionally, the resonant inductor ($L_r$) 104 is electrically connected to the transformer primary side coil ($N_p$) 106.

Furthermore, as shown in FIG. 1 of the circuit diagram for the dual-output power converter of the present invention, the input voltage ($V_{in}$) 101 is electrically connected to the second N-channel power MOSFET switch ($Q_2$) 103. The second N-channel power MOSFET switch ($Q_2$) 103 is electrically connected to the resonant capacitor ($C_r$) 107, and the resonant capacitor (Cr) 107 is electrically connected to both the input voltage ($V_{in}$) 101 and the transformer primary-side magnetizing inductor ($L_m$) 105. Additionally, the resonant capacitor ($C_r$) 107 is electrically connected to the transformer primary-side coil ($N_p$) 106.

Continuing with FIG. 1 of the circuit diagram for the dual-output power converter of the present invention, the resonant capacitor ($C_r$) 107 is electrically connected to the input voltage ($V_{in}$) 101, the second N-channel power MOSFET switch ($Q_2$) 103, the transformer primary-side magnetizing inductor ($L_m$) 105, and the transformer primary-side coil ($N_p$) 106. The resonant capacitor ($C_r$) 107 has a resonant voltage ($V_{cr}$) 108.

Following FIG. 1 of the circuit diagram for the dual-output power converter of the present invention, the first resistor ($R_{o1}$) 113 is electrically connected to the transformer first secondary-side coil ($N_{s1}$) 110, the first diode ($D_1$) 111, and the first output capacitor ($C_{o1}$) 112. The first resistor ($R_{o1}$) 113 is associated with the first output voltage ($V_{o1}$) 114. The first diode ($D_1$) 111 is connected to the first output capacitor ($C_{o1}$) 112, and the transformer first secondary-side coil ($N_{s1}$) 110 is also connected to the first output capacitor ($C_{o1}$) 112.

In addition, as shown in FIG. 1 of the circuit diagram for the dual-output power converter of the present invention, the second output resistor ($R_{o2}$) 123 is electrically connected to the transformer second secondary-side coil ($N_{s2}$) 120, the second diode ($D_2$) 121, and the second output capacitor ($C_{o2}$) 122. The second output resistor ($R_{o2}$) 123 is associated with the second output voltage ($V_{o2}$) 124. The second diode ($D_2$) 121 is connected to the second output capacitor ($C_{o2}$) 122, and the transformer second secondary-side coil ($N_{s2}$) 120 is also connected to the second output capacitor ($C_{o2}$) 122.

Figure 2:
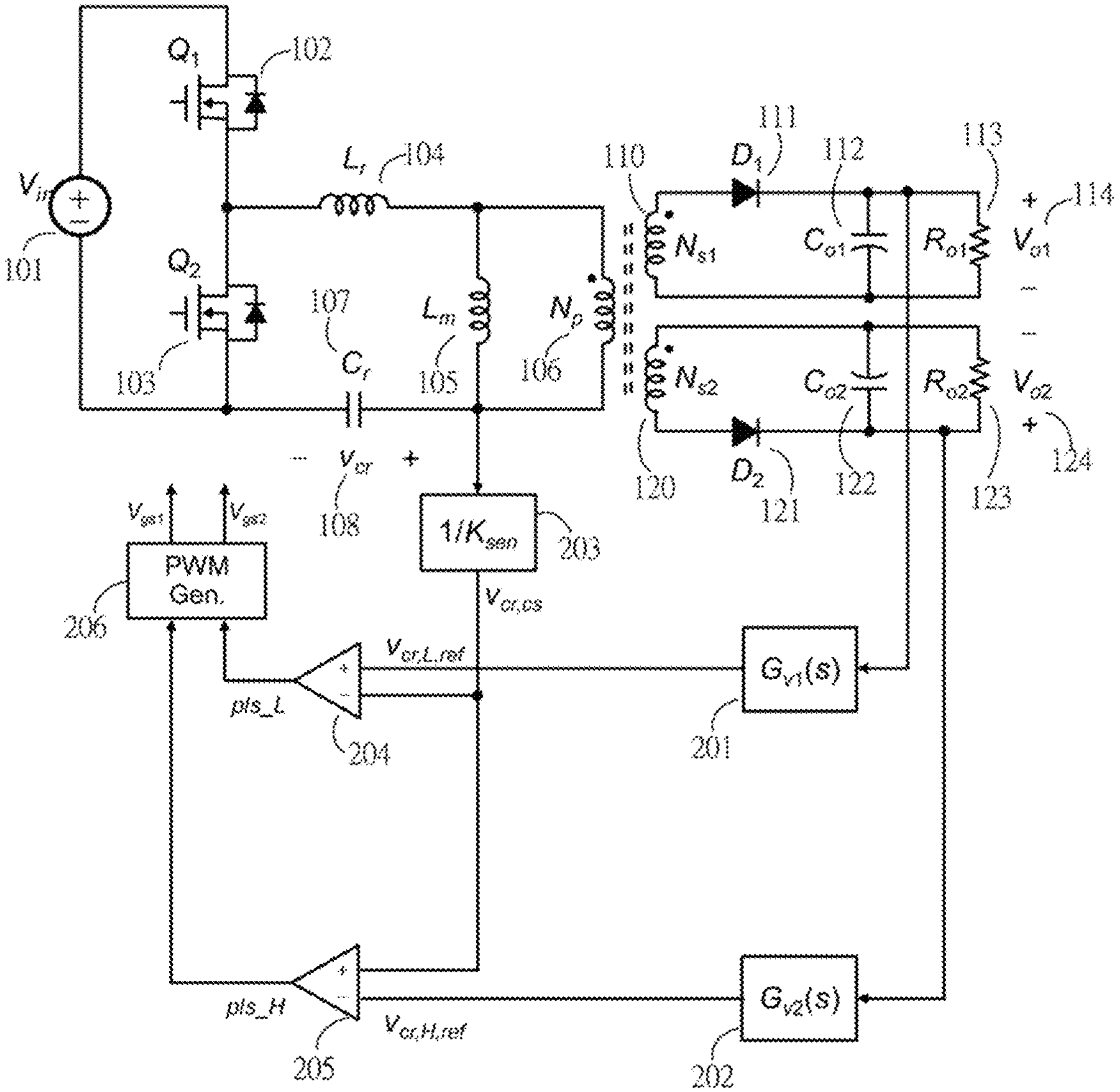
FIG. 2 shows the circuit diagram of the dual-output power converter of the present invention with an internal loop charge controller.

As shown in FIG. 2, the circuit diagram for the dual-output power converter of the present invention with an internal loop charge controller comprises: the first controller ($G_{v1}(S)$) 201, which is electrically connected to the first diode ($D_1$) 111, the first output capacitor ($C_{o1}$) 112, and the first output resistor ($R_{o1}$) 113.

As shown in FIG. 2 of the circuit diagram for the dual-output power converter of the present invention with an internal loop charge controller comprises the second controller ($G_{v2}(S)$) 202 is electrically connected to the second diode ($D_2$) 121, which is electrically connected to the second output capacitor ($C_{o2}$) 122, and is electrically connected to the second output resistor ($R_{o2}$) 123.

As shown in FIG. 2 of the circuit diagram for the dual-output power converter of the present invention with an internal loop charge controller, the pulse-width modulation generator (PWM generator) 206 is electrically connected to the first comparator ($V_{cr, L, ref}$) 204 and the second comparator ($V_{cr, H, ref}$) 205. The dual-output power converter further comprises a divider ($1/K_{sen}$) 203, which is electrically connected to the transformer primary-side excitation inductor ($L_m$) 105, the resonant capacitor ($C_r$) 107, and the transformer primary-side coil ($N_p$) 106.

Furthermore, as shown in FIG. 2 of the circuit diagram for the dual-output power converter of the present invention with an internal loop charge controller comprises: the first comparator ($V_{cr, L, ref}$) 204, which is electrically connected to the divider ($1/K_{sen}$) 203, and the first controller ($G_{v1}(S)$) 201. The second comparator ($V_{cr, H, ref}$) 205 is electrically connected to the second controller ($G_{v2}(S)$) 202, the divider ($1/K_{sen}$) 203, and the first comparator ($V_{cr, L, ref}$) 204.

Figure 3:
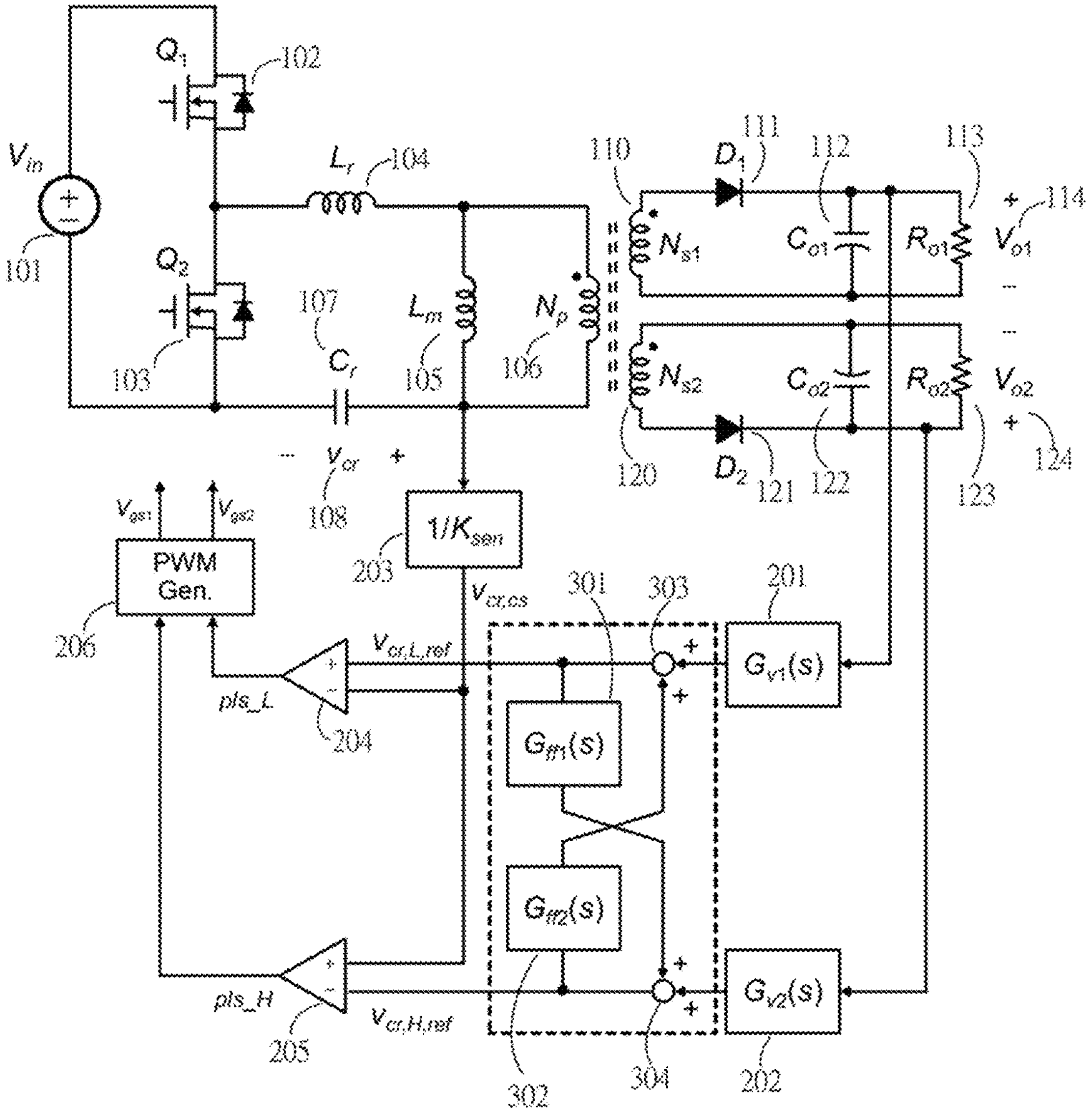
FIG. 3 shows the overall architecture of the circuit diagram of a dual-output power converter of the present invention.

As shown in FIG. 3, the overall structure of the circuit diagram for the dual-output power converter of the present invention comprises a third controller ($G_{ff1}(S)$) 301 and a fourth controller ($G_{ff2}(S)$) 302, as indicated by the dotted lines. The third controller ($G_{ff1}(S)$) 301 is electrically connected to the second adder 304 and the first comparator ($V_{cr, L, ref}$) 204.

Furthermore, as shown in FIG. 3, the overall structure of the circuit diagram for the dual-output power converter of the present invention comprises the fourth controller ($G_{ff2}(S)$) 302, which is electrically connected to the first adder 303 and the second comparator ($V_{cr, H, ref}$) 205.

Similarly, as shown in FIG. 3, the overall structure of the circuit diagram for the dual-output power converter of the present invention comprises an input voltage ($V_{in}$) 101, a first N-channel power MOSFET switch ($Q_1$) 102, a second N-channel power MOSFET switch ($Q_2$) 103, a resonant inductor ($L_r$) 104, a transformer primary side magnetizing inductor ($L_m$) 105, a transformer primary side coil ($N_p$) 106, and a resonant capacitor ($C_r$) 107.

Also, as shown in FIG. 3, the overall structure of the circuit diagram for the dual-output power converter of the present invention comprises the input voltage ($V_{in}$) 101 electrically connected to the first N-channel power MOSFET switch ($Q_1$) 102, the first N-channel power MOSFET switch ($Q_1$) 102 electrically connected to the resonant inductor ($L_r$) 104, the resonant inductor ($L_r$) 104 electrically connected to the transformer primary-side magnetizing inductor ($L_m$) 105, and the resonant inductor ($L_r$) 104 electrically connected to the transformer primary-side coil ($N_p$) 106.

Furthermore, as shown in FIG. 3, the overall structure of the circuit diagram for the dual-output power converter of the present invention comprises the input voltage ($V_{in}$) 101 electrically connected to the second N-channel power MOSFET switch ($Q_2$) 103, the second N-channel power MOSFET switch ($Q_2$) 103 electrically connected to the resonant capacitor ($C_r$) 107, the resonant capacitor ($C_r$) 107 electrically connected to the transformer primary-side magnetizing inductor ($L_m$) 105, and the resonant capacitor ($C_r$) 107 electrically connected to the transformer primary-side coil ($N_p$) 106.

As shown in FIG. 3, the overall structure of the circuit diagram of the dual-output power converter of the present invention comprises a transformer first secondary-side coil ($N_{s1}$) 110, a first diode ($D_1$) 111, a first output capacitor ($C_{o1}$) 112, a first output resistor ($R_{o1}$) 113, and a first output voltage ($V_{o1}$) 114. Wherein, the transformer first secondary-side coil ($N_{s1}$) 110 is electrically connected to the first diode ($D_1$) 111, the first diode ($D_1$) 111 is electrically connected to the first output capacitor ($C_{o1}$) 112, the first output capacitor ($C_{o1}$) 112 is electrically connected to the first output resistor ($R_{o1}$) 113 and the first output voltage ($V_{o1}$) 114. Additionally, the first output capacitor ($C_{o1}$) 112 is electrically connected to the transformer first secondary-side coil ($N_{s1}$) 110.

As shown in FIG. 3, the overall structure of the circuit diagram for the dual-output power converter of the present invention comprises a transformer second secondary-side coil ($N_{s2}$) 120, a second diode ($D_2$) 121, a second output capacitor ($C_{o2}$) 122, a second output resistor ($R_{o2}$) 123, and a second output voltage ($V_{o2}$) 124. Wherein, the transformer second secondary-side coil ($N_{s2}$) 120 is electrically connected to the second diode ($D_2$) 121, the second diode ($D_2$) 121 is electrically connected to the second output capacitor ($C_{o2}$) 122, the second output capacitor ($C_{o2}$) 122 is electrically connected to the second output resistor ($R_{o2}$) 123, and the second output voltage ($V_{o2}$) 124. In addition, the second output capacitor ($C_{o2}$) 122 is electrically connected to the transformer second secondary-side coil ($N_{s2}$) 120.

As shown in FIG. 3, the overall structure of the circuit diagram for the dual-output power converter of the present invention comprises a first controller ($G_{v1}(S)$) 201, a second controller ($G_{v2}(S)$) 202, a voltage divider ($1/K_{sen}$) 203, a first comparator ($V_{cr,\ L,\ ref}$) 204, a second comparator ($V_{cr,\ H,\ ref}$) 205, and a pulse-width modulation (PWM) generator 206. Wherein, the first controller ($G_{v1}(S)$) 201 is electrically connected to the first output resistor ($R_{o1}$) 113, and the first comparator ($V_{cr,\ L,\ ref}$) 204 is electrically connected to the PWM generator 206. Similarly, the second controller ($G_{v2}(S)$) 202 is electrically connected to the second output resistor ($R_{o2}$) 123, and the second comparator ($V_{cr,\ H,\ ref}$) 205 is electrically connected to the PWM generator 206. The voltage divider ($1/K_{sen}$) 203 is electrically connected to the first comparator ($V_{cr,\ L,\ ref}$) 204, the second comparator ($V_{cr,\ H,\ ref}$) 205, and the transformer primary side magnetizing inductor ($L_m$) 105.

It is understood that various modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A dual-output power converter, comprising:

an input voltage;

a first N-channel power metal oxide semiconductor field effect transistor switch being electrically connected to said input voltage;

a second N-channel power metal oxide semiconductor field effect transistor switch being electrically connected to said input voltage, and being electrically connected to said first N-channel power metal oxide semiconductor field effect transistor switch;

a resonant inductor being electrically connected to the first N-channel power metal oxide semiconductor field effect transistor switch and being electrically connected to said second N-channel power metal oxide semiconductor field effect transistor switch;

a transformer primary-side magnetizing inductor being electrically connected to said resonant inductor;

a transformer primary-side coil being electrically connected to said resonant inductor, and being electrically connected to said transformer primary-side magnetizing inductor;

a resonant capacitor being electrically connected to said input voltage, being electrically connected to said second N-channel power metal oxide semiconductor field effect transistor switch, and being electrically connected to said transformer primary-side magnetizing inductor and said transformer primary-side coil, wherein said resonant capacitor having a resonant voltage;

a first output resistor being electrically connected to a transformer first secondary-side coil, being electrically connected to a first diode, and being electrically connected to a first output capacitor, said first output resistor having a first output voltage, said first diode being electrically connected to said first output capacitor, and said transformer first secondary-side coil being electrically connected to said first output capacitor;

a second output resistor being electrically connected to a transformer second secondary-side coil, being electrically connected to a second diode, and being electrically connected to a second output capacitor, wherein said second output resistor having a second output voltage, said second diode being electrically connected to said second output capacitor, and said transformer second secondary-side coil is electrically connected to said second output capacitor;

a first controller being electrically connected to a first diode, said first controller electrically being connected to a first output capacitor, and said first controller electrically being connected to the first output resistor;

a second controller being electrically connected to a second diode, said second controller being electrically connected to a second output capacitor, and said second controller being electrically connected to a second output resistor; and a pulse-width modulation generator being electrically connected to a first comparator and said pulse-width modulation generator is electrically connected to a second comparator.

2. The dual-output power converter as according to claim 1, further comprising:

a divider is electrically connected to a transformer primary-side magnetizing inductor.

3. The dual-output power converter according to claim 2, further comprising:

a first comparator being electrically connected to a divider; and a second comparator is electrically connected to said divider and being electrically connected to said first comparator.

4. The dual-output power converter according to claim 3, further comprising:

a third controller being electrically connected to a second adder, and said third controller is electrically connected to a first comparator.

5. The dual-output power converter according to claim 4, further comprising:

a fourth controller being electrically connected to a first adder, and said fourth controller is electrically connected to a second comparator.

* * * * *